(12) United States Patent
Rozsa et al.

(10) Patent No.: US 9,874,437 B2
(45) Date of Patent: Jan. 23, 2018

(54) METHOD FOR THE 3-DIMENSIONAL MEASUREMENT OF A SAMPLE WITH A MEASURING SYSTEM COMPRISING A LASER SCANNING MICROSCOPE AND SUCH MEASURING SYSTEM

(75) Inventors: Balazs Rozsa, Budapest (HU); Gergely Katona, Budapest (HU); Ferenc Csikor, Budapest (HU); Pal Maak, Budapest (HU)

(73) Assignee: Femtonics Kft., Budapest (HU)

( * ) Notice: Subject to any disclaimer, the term of this patent is extended or adjusted under 35 U.S.C. 154(b) by 840 days.

(21) Appl. No.: 14/368,936

(22) PCT Filed: Jan. 5, 2012

(86) PCT No.: PCT/HU2012/000002
§ 371 (c)(1),
(2), (4) Date: Oct. 6, 2014

(87) PCT Pub. No.: WO2013/098567
PCT Pub. Date: Jul. 4, 2013

(65) Prior Publication Data
US 2015/0032414 A1    Jan. 29, 2015

(30) Foreign Application Priority Data
Dec. 28, 2011   (HU) .................................... 1100728

(51) Int. Cl.
*G01B 3/22*     (2006.01)
*G01B 11/24*    (2006.01)
(Continued)

(52) U.S. Cl.
CPC ............... *G01B 11/24* (2013.01); *G01B 9/04* (2013.01); *G06F 3/01* (2013.01); *G06F 3/011* (2013.01)

(58) Field of Classification Search
CPC .. G01B 9/04; G01B 11/24; G06F 3/01; G06F 3/011; H04N 13/0278; H04N 13/0468
(Continued)

(56) References Cited

U.S. PATENT DOCUMENTS

| 6,043,452 A | * | 3/2000 | Bestenlehrer | ...... | B23K 26/0075 219/121.62 |
| 8,121,717 B2 | * | 2/2012 | Idaka | ................. | G05B 19/4086 345/420 |
| 9,482,524 B2 | * | 11/2016 | Metzler | .................. | G01B 21/04 |

* cited by examiner

Primary Examiner — An Do
(74) Attorney, Agent, or Firm — Olson & Cepuritis, Ltd.

(57) ABSTRACT

The invention relates to a method for the 3-dimensional measurement of a sample with a measuring system having a 3-dimensional measuring space and comprising a laser scanning microscope, characterised by—providing the measuring system with a 3-dimensional virtual reality device,—creating the 3-dimensional virtual space of the measuring space using the 3-dimensional virtual reality device,—allowing for selecting an operation in the virtual space,—providing real-time unidirectional or bidirectional connection between the measuring space and the virtual space such that an operation selected in the virtual space is performed in the measuring space and data measured in the measuring space is displayed in the virtual space. The invention further relates to a measuring system for the 3-dimensional measurement of a sample, the measuring system having a 3-dimensional measuring space and comprising a laser scanning microscope, characterised by further comprising a 3-dimensional virtual reality device for displaying a 3-dimensional virtual space of the measuring space, and a real-time unidirectional or bidirectional connection is provided between the laser scanning microscope and the 3-dimensional virtual reality device.

28 Claims, 4 Drawing Sheets

(51) Int. Cl.
*G06F 3/01* (2006.01)
*G01B 9/04* (2006.01)

(58) Field of Classification Search
USPC .............. 702/127, 155, 167–169; 345/7, 156
See application file for complete search history.

METHOD FOR THE 3-DIMENSIONAL MEASUREMENT OF A SAMPLE WITH A MEASURING SYSTEM COMPRISING A LASER SCANNING MICROSCOPE AND SUCH MEASURING SYSTEM

CROSS-REFERENCE TO RELATED APPLICATIONS

This application is a U.S. National Phase of PCT/HU2012/000002, filed Jan. 5, 2012, which claims priority of Hungarian Patent Application No. P1100728, filed Dec. 28, 2011, each of which is incorporated herein by reference.

The present invention relates to a method for the 3-dimensional measurement of a sample with a measuring system having a 3-dimensional measuring space and comprising a laser scanning microscope. The invention further relates to such a measuring system.

According to the state of the art many 3-dimensional imaging devices exist (CT, MRI, ultrasound, various laser scanning methods, e.g. confocal microscope, 2-photon microscope, 3-dimensional 2-photon microscope, spinning disc confocal microscope, atomic force microscope). These devices are generally connected to conventional computer-configurations, i.e. the 3-dimensional (3D) information resulting from the measurement is displayed as a 2-dimensional (2D) projection on a monitor. In medical, biological application fast perception of the information and fast decision making is important because biological samples often have a short life-span or the measured phenomenon can only be observed within a limited time period. In case of such samples it is often an objective to change the examined sample by performing surgical interaction, or an experiment. In some instances stereoscopic displays are used in order to enhance viewing of the obtained data, however the viewing is separated in time from the measurement and the physical interaction performed on the sample.

The 3-dimensional measurement of biological samples can be performed by 3-dimensional (3D) laser scanning microscopes which carry out the measurement by scanning the sample from point to point. The 3D laser scanning technologies are very important in analysing biological samples, in particularly in imaging 3-dimensional biological structures and tracing alteration of such structure on different time scales.

Commonly used 3D laser scanning microscopes are either confocal microscopes or two-photon microscopes. In the confocal microscope technology a pinhole is arranged before the detector to filter out light reflected from any other plane than the focus plane of the microscope objective. Thereby it is possible to image planes lying in different depths within a sample (e.g. a biological specimen).

Two-photon laser scanning microscopes use a laser light of lower energy of which two photons are needed to excite a flourophore in a quantum event, resulting in the emission of a fluorescence photon, which is then detected by a detector. The probability of a near simultaneous absorption of two photons is extremely low requiring a high flux of excitation photons, thus two-photon excitation practically only occurs in the focal spot of the laser beam, i.e. a small ellipsoidal volume having typically a size of approximately 300 nm×300 nm×1000 nm. Generally a femtosecond pulsed laser is used to provide the required photon flux for the two-photon excitation, while keeping the average laser beam intensity sufficiently low.

When applying either of the above-mentioned technologies the 3D scanning can be carried out by moving the sample stage e.g. via stepping motors, however this is complicated to implement when using submerge specimen chambers or when electrical recording is performed on the biological specimen with microelectrodes. Accordingly, in the case of analysing biological specimens it is often preferred to move the focus spot of the laser beam instead of moving the specimen. This can be achieved by deflecting the laser beam to scan different points of a focal plane (XY plane) and by displacing the objective along its optical axis (Z axis) e.g. via a piezo-positioner to change the depth of the focal plane. Several known technologies exist for deflecting the laser beam prior to it entering the objective, e.g. via deflecting mirrors mounted on galvanometric scanners, or via accousto-optical deflectors.

Further possibility is the use of so called holographic microscopy, where the desired 2- or 3-dimensional scanning effect is achieved by using a spatial light modulator (SLM) (Volodymyr Nikolenko, Brendon O. Watson, Roberto Araya, Alan Woodruff, Darcy S. Peterka and Rafael Yuste, 2008, Frontiers in Neuronal Circuits). A new technology for performing 3D scanning which can be used in combination with the prior systems is the so called spatiotemporal multiplexing microscopy, i.e. spatial impulse separation (Adrian Cheng, J Tiago Gonçalves, Peyman Golshani, Katsushi Arisaka, Carlos Portera-Cailliau, 2011, Nature Methods). In this method a single laser impulse is divided by beam splitters into more than one portions and each sub-impulse is focused to different planes with different time delay, because each one traverses different imaging systems that image the sub-impulses into different focal planes. For the purpose of spatial scanning the sub-impulses that impact sequentially in time are separated by fast photon counting detectors.

The galvanometric scanners and the acousto-optical deflectors are very fast devices, hence moving the focus spot to a desired XY plane position and obtaining measurement data via the detector in that position can be carried out in less than 1 µs. However, due to the inertia of the microscope objective the Z positioning takes substantially more time, rendering the 3D scanning a lengthy operation.

In order to achieve the signal per noise ratio commonly accepted in the art and supposing an average objective and an average sample size the measurement can take many minutes (e.g. scanning a volume of 512×512×200 pixels with a 2-photon microscope preferably with a resolution that is greater than the optical resolution the measurement may take 5-20 minutes). However, fast physiological reactions taking place in biological samples are in the order of ms (e.g. action potential, synaptic signal transmission). The measuring time of scanning microscopes can be decreased by measuring only along the relevant regions, curves, points leaving out other parts of the sample. Such a technology is disclosed for example in WO2010/007452. However the application of this and similar technologies requires first the spatial selection of a portion of the 3D sample.

A technology is known from the prior art (see Katona et al.: Roller Coaster Scanning reveals spontaneous triggering of dendiritc spikes in CA1 interneurons. PNAS, Feb. 1, 2011, vol. 108, no. 5) wherein the sample is scanned in planes orthogonal to the optical axis of the laser scanning microscope and the 2D sections are displayed one after the other to the user simulating forward or backward movement along the optical axis. The users have to select the configuration (regions, curves, points) to be measured on the 2D sections.

The known method has a number of disadvantages: first of all it is difficult to orientate oneself in a typical biologic object that has a complicated spatial structure as in the case of various nerve-cell types. The problem arises in particular when the objects are perpendicular to the scanned planes and when they are in the proximity of each other, in such cases it is difficult to trace the continuous objects and to distinguish the separate objects between two neighbouring planes (see e.g. electron microscope reconstruction programs). The situation is further aggravated if poor quality, low signal per noise ratio images need to be analysed or continuity and distinctness of objects have to be determined in such images.

A further disadvantage is that very often there is not enough time to view the 2D sections because of the locally permanently changing position of the sample. For example if the user would like to select the ideally required several hundreds of measuring points in 3D this process would require such a long time that the sample would loose its original position even before finishing the selection to such an extent that the points selected at the beginning would no longer be in the correct position.

It is an objective of the present invention to provide a method and a measuring system for the analysis of 3-dimensional samples using a laser scanning microscope that overcomes the problems associated with the prior art.

It has been realised that if the measuring space of a laser scanning microscope (or other physical operation device) is displayed by a 3-dimensional virtual reality device and a real-time connection is provided between the measuring space and the 3-dimensional virtual space the above disadvantages can be overcome because 3-dimensional viewing is more natural for a user conducting the measurement and even worse quality images with lower signal per noise ratio can be better interpreted and continuity and distinctness can be determined more easily.

Accordingly, the objective of the invention is achieved by a method for the 3-dimensional measurement of a sample with a measuring system having a 3-dimensional measuring space and comprising a laser scanning microscope, which method is characterised by providing the measuring system with a 3-dimensional virtual reality device, creating the 3-dimensional virtual space of the measuring space in a real space region that is spaced from the measuring space using the 3-dimensional virtual reality device, allowing for selecting an operation in the virtual space, providing real-time bidirectional connection between the measuring space and the virtual space such that an operation selected in the virtual space is performed in the measuring space and data measured in the measuring space is displayed in the virtual space.

The above objective is further achieved by providing a measuring system for the 3-dimensional measurement of a sample, the measuring system having a 3-dimensional measuring space and comprising a laser scanning microscope. The measuring system is characterised by comprising a 3-dimensional virtual reality device for displaying a 3-dimensional virtual space of the measuring space in a real space region that is spaced apart from the measuring space, and a real-time bidirectional connection is provided between the laser scanning microscope and the 3-dimensional virtual reality device.

Advantageous embodiments of the invention are defined in the attached dependent claims.

Further details of the invention will be apparent from the accompanying figures and exemplary embodiments.

Figure 1:
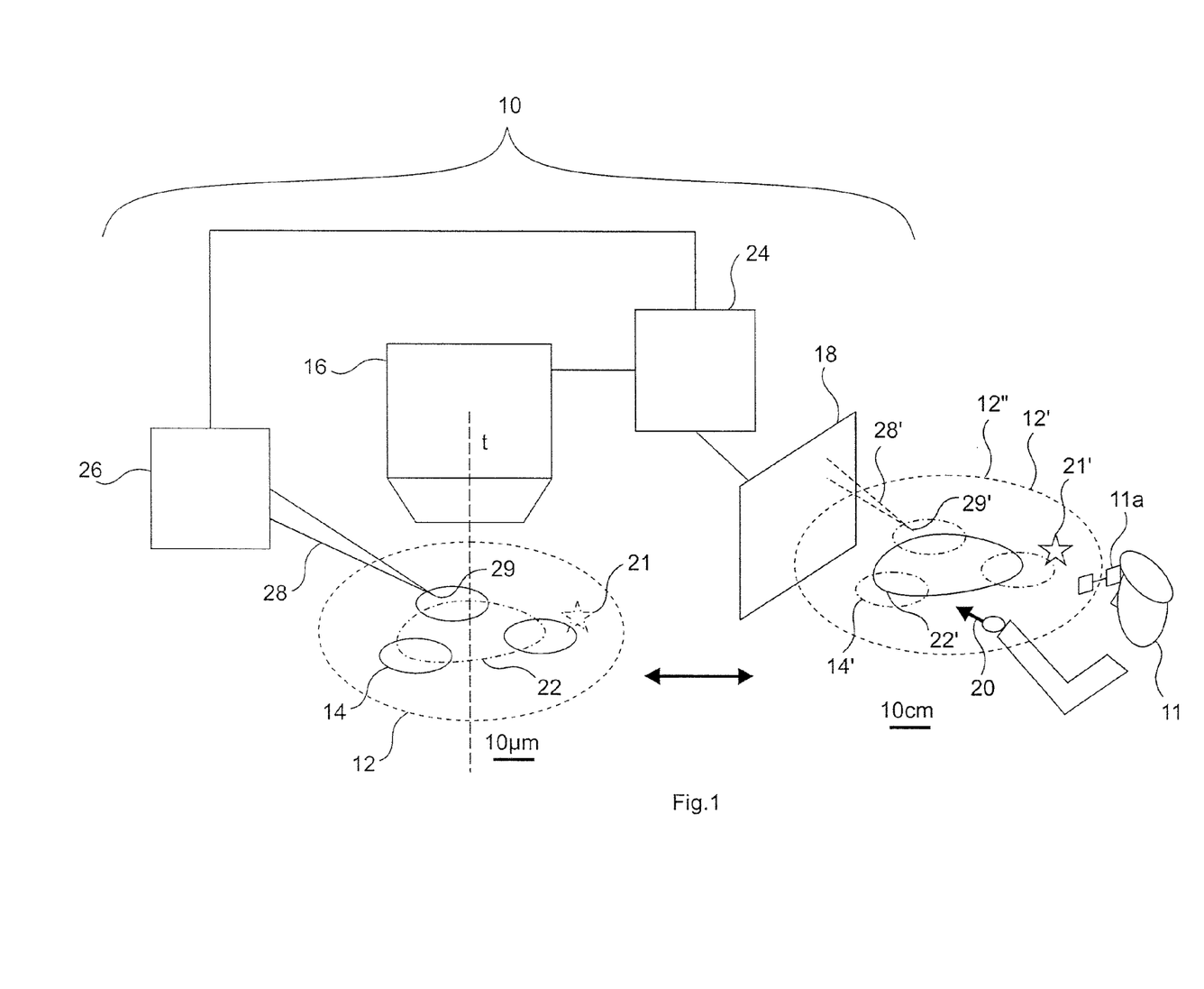
FIG. 1 is a schematic diagram of an exemplary measuring system according to the invention.

FIG. 1 is a schematic diagram of a measuring system 10 according to the invention. The measuring system 10 has a 3-dimensional measuring space 12 wherein a schematically illustrated sample 14 has been placed. The measuring space 12 is the spatial region within which physical operation can be performed on the sample 14. Under physical operation the measurement of physical parameters as well as physical interaction is meant. Hence, the measuring space 12 is that spatial region of the measuring system 10 within which a physical parameter of the sample 14 can be measured or within which it is possible to physically interact with the sample 14. In the context of the present invention physical parameter is understood to embrace physical, chemical, photochemical, biological, etc. parameters that can be measured by any kind of measuring apparatus, and physical interaction is understood to mean any kind of physical, chemical, photochemical, biological, etc. interaction which is primarily aimed at inducing a change in a physical parameter of the sample 14, as well as the process of placing any kind of tool or apparatus in the sample 14.

The measuring system 10 comprises a laser scanning microscope 16 the measuring space of which (i.e. the spatial region within which it is possible to measure with the microscope) is not distinguished from the measuring space 12 of the measuring system 10 for the sake of simplicity. It is to be noted that the two measuring spaces 12 generally coincide because the measuring space of the microscope 16 is comprised by the measuring space 12 of the measuring system 10, furthermore, the latter typically does not exceed the measuring space of the microscope 16 since any other measurement or interaction is conventionally performed within the spatial region that can be scanned by the microscope 16. It is to be noted furthermore that the measuring space 12 is defined with respect to the sample stage of the microscope 16, hence it is conceivable that the focal point of the microscope 16 is shifted relative to the sample 14 by displacing the sample stage, also the measuring space can be enlarged with respect to what can be scanned by simply deflecting the laser beam by moving the sample stage to various positions.

The measuring system 10 further includes some kind of a 3-dimensional virtual reality (VR) device 18 which creates a 3-dimensional virtual space 12' of the measuring space 12 in a real space region 12" that is spaced from the measuring space 12. Various VR devices 18 are known from the art such as stereoscopic and autostereoscopic displays. The concept of the stereoscopic displays is to display a right side and a left side image for the right and the left eye of a user 11 respectively, which are perceived as a single 3D image by the human brain. If the right side and the left side image are not projected in a separated way to the right and left eye of the user 11 respectively, then the two images are typically projected by two light beams having different physical properties (for example blue and red light, orthogonally polarised light beams, etc.) In this case the display requires an active or passive user device 11a (typically glasses) for separating the right side and the left side images. The active user device 11a can be for example alternating shutter glasses whereas the passive user device 11b may be for example polarised 3D glasses.

The autostereoscopic displays do not require any kind of user device 11a, because in this case the display is formed such that the user 11 sees only the right side image with the right eye and sees only the left side image with the left eye. For example this is how the parallax controlled displays function.

In case of the above displays it is preferred to use head position tracking, e.g. by applying the technology disclosed in WO2005/116809. This way the two images destined for the two eyes of the user 11 can be imaged by the 3-dimensional display according to the position of the user's 11 eyes, whereby the displayed virtual space 12' does not appear distorted.

Apart from stereoscopic displays other VR devices 18 can be used as well, for example, such that create the virtual space 12' as a real image, which is spatially distinct from the measuring space 12. Such displays are for example holographic displays (see WO9834411), and 3D laser projectors that project a 3D image into the air with laser beams.

In the virtual space 12' created by the arbitrary VR device 18 the measuring points of the sample 14 that are measured by the measuring system 10 are also displayed by the VR device 18. This can be done by first scanning in 3D the sample 14 placed in the measuring space 12 of the laser scanning microscope 16. Here, the objective is to allow the user 11 to view the whole of the sample 14 that can only be scanned relative slowly, and to allow the user 11 to identify and select regions of interest therein for performing further measurement or interaction. The VR device 18 displays the virtual image of the scanned sample 14 within the virtual space 12', i.e. the VR device 18 displays a virtual sample 14' for the user 11.

Scanning the whole of the sample 14 in 3D can be carried out for example by scanning the sample 14 in a plurality of planes that are orthogonal or transversal to the optical axis t of the laser scanning microscope 16, and displaying the scanned planes by the VR device 18 in the virtual space 12'.

It is also possible to display the 3D array of the scanned sample 14 in the virtual space 12' like a fog by applying some kind of a projection (typically maximum intensity projection). For this kind of real time display typically a lot of graphical calculation is required, that is preferably implemented in the graphics accelerator or GPU of the computer.

In another preferred embodiment the scanned sample 14 is displayed as spatial surface element in the virtual space 12' after suitable calculations and one or more simulated light sources are applied to increase the 3-dimensional effect.

The user 11 may select operations on the virtual sample 14' displayed in the virtual space 12'. The measuring system 10 preferably comprises a 3D input device 20 for selecting an operation. Such input devices 20 are known from the art, for example: 3D pointing device in the form of an arm, gesture control recognised by a camera, active/passive markers on the hand or a handheld device that are detected by an infra red camera (such markers are disclosed in WO2005/116809), etc. The measuring system 10 may include one or more 3D input devices 20 (markers) and the applied markers can be of different types, e.g. pen, glove, ball, pin, etc. In a preferred embodiment of the measuring system 10 according to the invention a pen like 3D marker allowing for absolute positioning with six degrees of freedom (see WO2005/116809) is used as the input device 20. The 3D marker can be displayed in the virtual space 12' as a conventional cursor. Application of the above mentioned head position tracking has the advantage of making it possible to display the virtual cursor in the virtual space 12' so as to coincide exactly with the real spatial position of the 3D marker (i.e. the position perceived by the user 11 when moving the marker in the real space region 12").

The measuring system 10 allows for real time bidirectional connection between the measuring space 12 and the virtual space 12'. This means that an operation selected in the virtual space 12' is carried out in the measuring space 12 and the data measured in the measuring space 12 is displayed in the virtual space 12'.

Such an operation can be the selection of a virtual configuration 22' in the sample's 14 virtual image within the virtual space 12' (preferably by a 3D input device 20), the virtual configuration 22' consisting of one or more points and/or curves and/or regions, and commanding the laser scanning microscope 16 to scan a real configuration 22 corresponding to the virtual configuration 22' in the measuring space 12. In order to do this a controlling system 24 (typically computer or a controlling program running on the computer) of the measuring system 10 calculates the coordinates of the real configuration 22 corresponding to the virtual configuration 22' in the measuring space 12, and controls the laser scanning microscope 16 so as to scan the sample 14 along or within the real configuration 22 corresponding to the selected virtual configuration 22'. This involves moving the focal point of the laser scanning microscope 16 along or within the real configuration 22, which can be performed by deflecting the laser beam and changing the focal depth and/or by displacing the objective of the microscope 16 and/or by displacing the sample stage. Scanning a given point or scanning along a given curve or within a given region of the sample 14 by the laser scanning microscope 16 can be carried out for example as disclosed in WO2010/007452 or WO2010/055362 or WO2010/055361.

In the course of scanning the real configuration 22 the measurement data obtained by the microscope 16 can be displayed by the VR device 18 in the virtual space 12' in real time, thus the user 11 obtains real time feed-back from the performance of the selected scanning operation.

The user can also place virtual markings 21' in the virtual space 12' with the help of the 3D input device 20, in respect of which he may optionally select an operation. For example the virtual marking 21' may relate to a certain property or the selection/marking of the corresponding marked point 21 in the measuring space 12 for any reason.

Preferably, the user 11 is not only able to select operations to be performed by the laser scanning microscope 16 within the measuring system 10. Preferably, the measuring system 10 also comprises one or more other physical operation devices 26 for performing a physical operation in the measuring space 12 such as the performance of a physical interaction or the measurement of physical parameters. For example a suitable operation device 26 may serve to apply mechanical or laser manipulation in the measuring space 12 of the microscope 12 or it may serve to control the supply/addition of chemicals or other substances locally to the sample 14 or to release substances locally within the sample 14. For example the operation selected by the user 11 in the virtual space 12' can be the selection of stimulation points and the operation device 26 can serve to carry out the stimulation. The stimulation may be achieved for example by optical stimulation, by provoking mechanical or electronic response or by injecting a chemical reagent.

The operation device 26 of the measuring system 10 serving to carry out a physical interaction can be a robot surgical device, such as a knife, a laser ablation device, ultrasound coagulator, laser coagulator, micro injector, vacuum suction device, optical cable, electric stimulator, etc. or a measuring device to be inserted in the sample 14 such as an electrode, micro pipette used for patch-clamp technique, endoscopic device or an electrophoretic measuring head. The operation device 26 may be suitable for carrying out targeted laser microsurgery at a cell or axon level.

The operation device 26 may also serve to perform various specific measurements. The specific measurement is generally a 3D measuring process that is narrowed down and thus accelerated in time, and can be carried out in a smaller spatial region or along a sub-surface or curve or at single points. For example in the case of patch-clamp measurement the firing pattern of the cells can be traced at higher speeds as well. Such measurements are often combined into protocols that include applying a stimulus and analysing the response thereto. The stimulus can be an electrode provoking an electric stimulus response, or a sensory stimulus, ionthophoresis or local photochemical release of substances, photostimulation of light sensitive proteins or various local shocks.

Preferably, the VR device 18 also displays the operation device 26 within the virtual space 12' in some form, for example a tool 28 of the operation device 26 performing the physical interaction is represented by a virtual tool 28' in the virtual space 12'. It is also conceivable that operation device 26 has no concrete interacting tool 28 (e.g. in the case of a photostimulation device) but even then it is possible to determine an interaction point 29 as the point of interaction with the sample 14 and this can be displayed by the VR device 18 in the form of a virtual interaction point 29'.

Preferably, the user 11 may select operations for the operation device 26 as well with the help of the 3D input device, for example a virtual configuration 22' may be selected in order to move the interaction point 29 of the operation device 26 along or within the real configuration 22 corresponding to the selected virtual configuration 22'. Preferably the user 11 may grab the virtual tool 28' or virtual interaction point 29' with the help of the cursor of the input device 20, and may drag this to a desired point of the virtual sample 14' in order to command the operation device 26 to perform a physical operation at the corresponding point of the measuring space 12.

Preferably the controlling system 24 of the measuring system 10 also controls the operation device 26, i.e. the controlling system 24 transmits the operation selected in the virtual space 12' to the operation device 26 as a command that can be carried out by the latter.

When performing the selected operation by the operation device 26, it may also provide measurement data (e.g. an electrode can measure the potential of a cell membrane) which may be displayed real time in the virtual space 12' by the VR device 18.

Figure 2A:
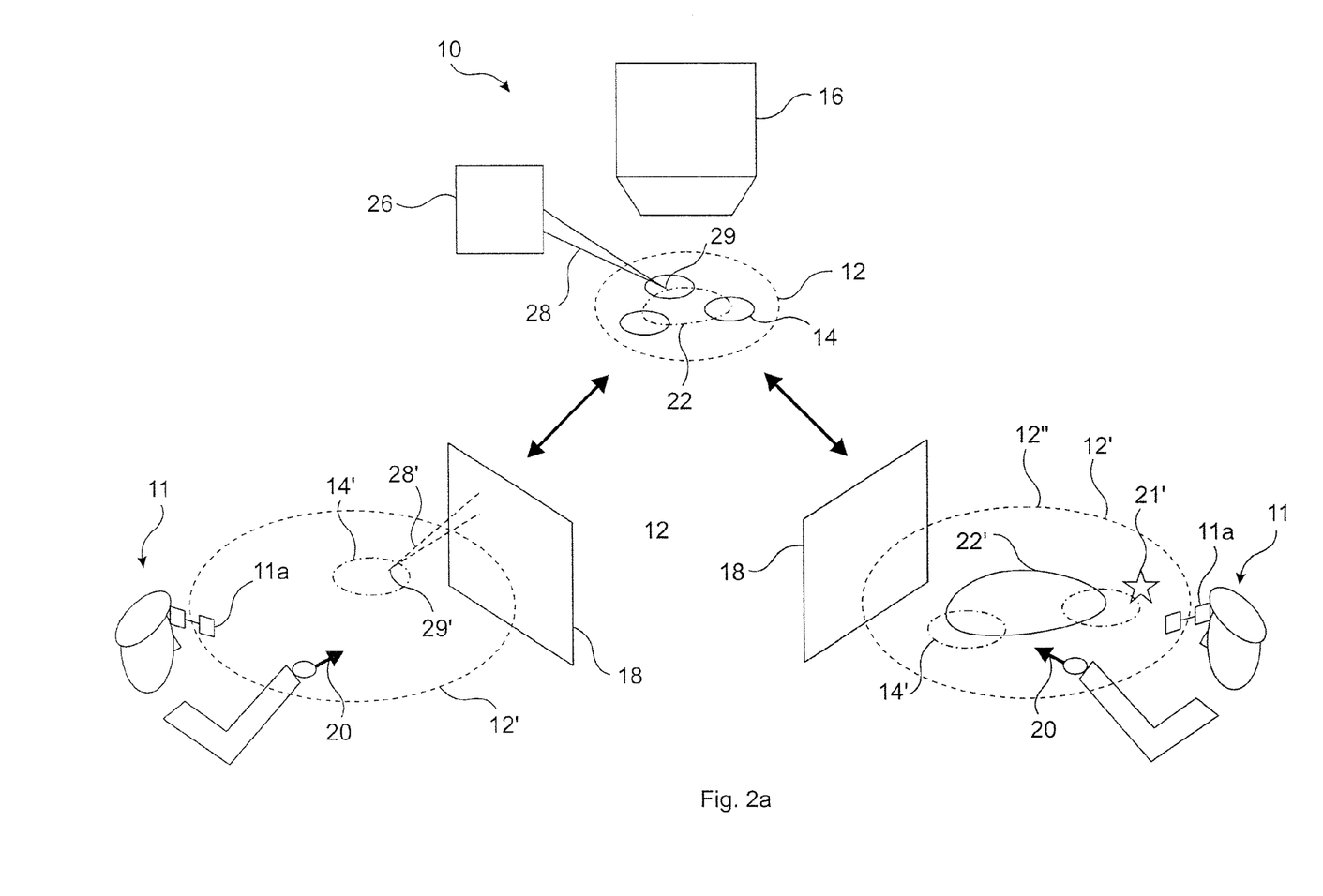
FIG. 2a is a schematic diagram of another preferred embodiment of the measuring system according to the invention.

If the measuring system 10 is used to carry out complex operations it may occur that the measuring system 10 provides data faster than as it can be interpreted by the user 11. It is also possible that controlling the operation itself (e.g. measurement/surgery) requires so many decisions, interactions that it cannot be handled by a single person. For such cases it is preferred to provide a measuring system 10 for multiple users 11. This can be achieved by using a VR device 18 that is capable of providing virtual reality for a plurality of users 11 or a separate VR device 18 may be provided for each user 11 in order to display the virtual space 12'. The latter embodiment is illustrated in FIG. 2a. Two separate VR devices 18 create two separate virtual spaces 12' of the measuring space 12 for two users 11, and preferably each user 11 can select operations independently using the 3D input device 20 provided for the given VR device 18. The controlling system 24 preferably translates the operations selected in both virtual space 12' to commands that control the laser scanning microscope 16 and the interaction tool 28 of any optional operation device 26 in accordance with the selected operations. It may be advantageous to allocate the control of the microscope 16 and of the interaction tools 28 of the operation devices 26 between the users 11 in a multi-user measuring system 10. For example in the embodiment illustrated in FIG. 2a the first user 11 controls the laser scanning microscope 16 while the second user 11 controls the operation device 26. However, it is also conceivable that both users 11 control the same measuring instruments (microscope 16 and operation device 26) but in time sharing, making use of the fact that the measurement requires substantially less time than viewing of the results by the users 11. Time sharing can be applied for example when the aim is to perform some kind of checking on a large number of cells within the volume of the sample 14 in which case multiple users 11 can perform the checking simultaneously thereby sharing the work.

Figure 2B:
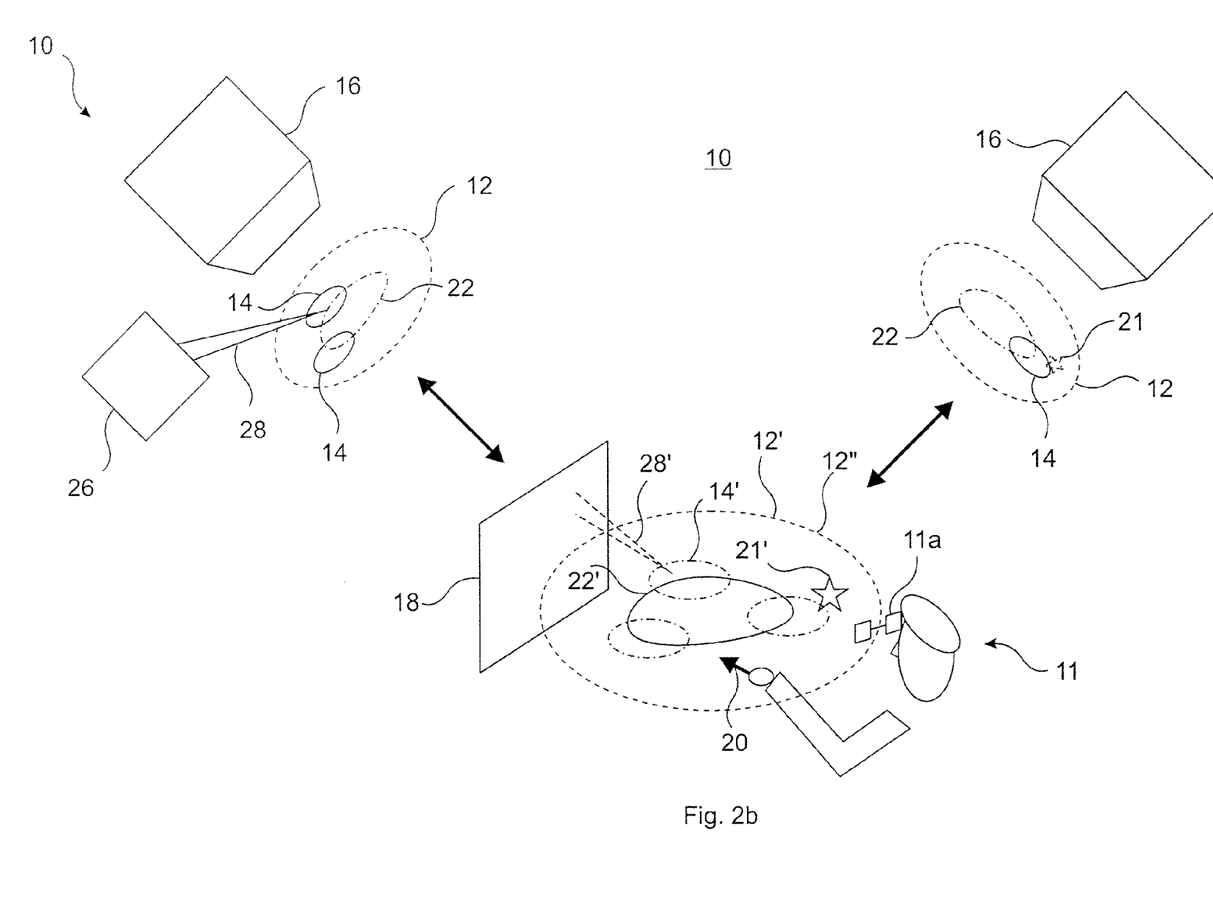
FIG. 2b is a schematic diagram of another preferred embodiment of the measuring system according to the invention.

The opposite of work sharing is also conceivable as illustrated in FIG. 2b. If different parts or aspects of the sample 14 are measured with separate measuring instruments (microscope 16 and other operation device 26) the data provided by those can be displayed by a single VR device 18, thus allowing the user 11 to decide based on more than one synchronised information and to control more types of or more complex interactions and operations. This technique may be applied for example for the simultaneous 3D measurement of the cells of the retina and of the visual cortex on the opposite side of the head processing the image of the retina.

Figure 2C:
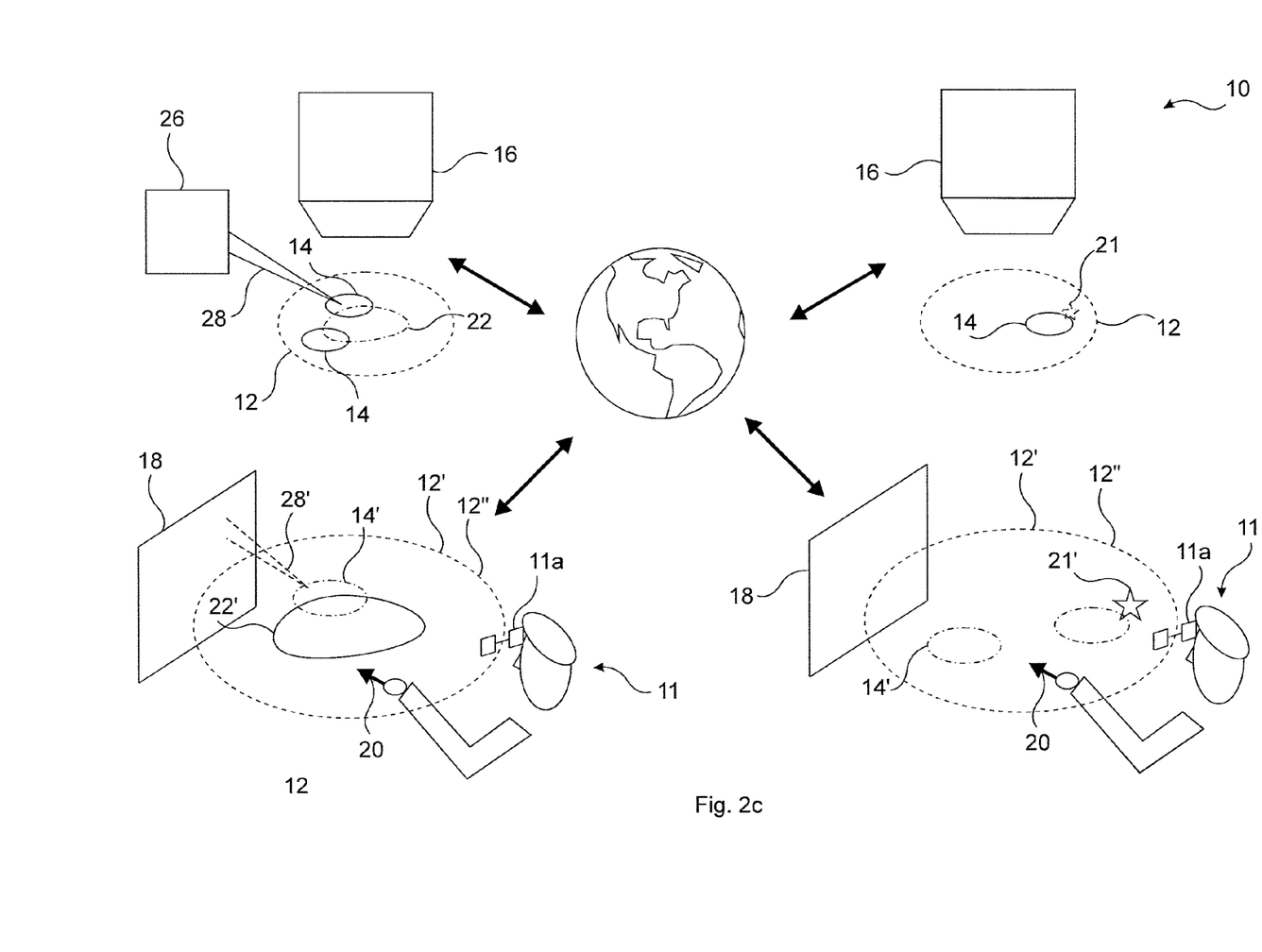
FIG. 2c is a schematic diagram of a further preferred embodiment of the measuring system according to the invention.

The connection between the VR device(s) 18 and the microscope 16 and other optional operation device(s) 26 may be a direct connection through local or global network, the latter including the Internet. For example a user 11 having special expertise in a certain scientific field can analyse the sample 14 or control the measurements performed on the sample 14 from a remote location of the world. In the case of remote connection it is also possible to allow access to the same measuring system 10 for multiple users 11 or to allow a single user 11 to control more than one measuring systems 10 (see FIG. 2c).

The measuring system 10 according to the invention can be used as follows.

The user 11 places the sample 14 into the measuring space 12 of the laser scanning microscope 16, and scans the sample 14 in 3D with the microscope 16. This may be performed for example by scanning the sample 14 along a plurality of planes perpendicular to the optical axis t. Following this the VR device 18 displays the scanned sample 14 in the virtual space 12' in the form of a virtual sample 14'. The user 11 can preferably manipulate the virtual sample 14' in the virtual space 12' with the help of the input device 20 that can be in the form of a 3D marker. For example the user 11 may grab the virtual sample 14', spatially rotate it, displace it, enlarge it or decrease its size, select operations on the virtual sample 14' to be carried out by the microscope 16 or optionally by other operation devices 26 belonging to the measuring system 10. For operations to be carried out by the microscope 16 the user 11 preferably selects a virtual configuration 22' consisting of one or more points and/or curves and/or regions with the help of the 3D marker. The measuring system 10 calculates the coordinates of the corresponding real configuration 22 in the measuring space 12, and based on the calculated coordinates the controlling system 24 controls the laser scanning microscope 16 so as to scan the sample 14 along or within the real configuration 22 corresponding to the selected virtual configuration 22'. The measured data can be displayed in the virtual space 12' by the VR device 18 of the measuring system 10 in real time based on which the user 11 can interfere even in the course of the measurement. Thus, there is real time connection between the measuring space 12 and the virtual space 12'. The user 11 preferably controls not only the laser scanning microscope 16 in the virtual space 12' but also other physical operation devices 26, which belong to the measuring system 10 as discussed before. The controlling system 24 provides for carrying out the operation selected in the virtual space 12' by the operation device 26 in the measuring space 12, while at the same time the VR device 18 of the measuring system 10 displays the data measured in the measuring space 12 by the operation device 26 and/or the laser scanning microscope 16. Hence, there is real time connection between the measuring space 12 and the virtual space 12' in this case as well, thus the user 11 may interfere even in the course of performing the selected operation, in real time, and may modify the measurement or select further measurements.

In a preferred embodiment the measuring system 10 operates at one or more frequencies simultaneously (at the same time) or nearly simultaneously. In this case the measurement (2-photon fluorescence intensity, fluorescence life time, transmission signal, second harmonics generation (SHG) signal, polarisation signal, etc.) can be performed at one or more frequencies while the physical operation (photochemical activation of molecules, light activated chemical or biological substances, photo activation of proteins, ablation, etc.) is carried out simultaneously or nearly simultaneously at one or more different frequencies. Due to the application of different frequencies the simultaneous physical operation and the measurement does not disturb each other, both can be traced and displayed in the 3D virtual reality environment.

Displaying the measurements and other physical operations in 3D virtual reality greatly enhances the effectiveness of controlling the laser scanning microscope 16 and other physical operation devices 26, because the user 11 can easily and naturally perceive the abstract or greatly enlarged information of the virtual space 12' that is presented to the user 11 in the form of a virtual reality environment, thus the user 11 can perform 3D selections necessary for the 3D operations and carry out the controlling thereof in a natural way. The most important tasks that are assisted by the measuring system 10 and method according to the invention are:
- viewing and understanding of the 3D data structure,
- orientation of the sample 14 and/or viewpoint and navigation,
- selection of measuring configurations (planes, curves, volumes) and setting various parameters therein,
- controlling special high speed measuring algorithms (see e.g. WO2010/055361, WO2010/007452) and performing selections within the measuring space 12 of the sample 14 for this purpose,
- selection and control of other operations by other operation devices 26,
- showing location specific measured data in the virtual space 12',
- checking the effect of interactions.

The invention allows for real time selection of the precise spatial position of a measurement in the measuring space 12 via a suitable 3D input device 20 (marker) operating in the corresponding virtual space 12', and allows for the continuous modification thereof. Consequently, the laser scanning microscope 16 need only scan a substantially smaller volume repeatedly, since the measurement is restricted to the real configuration 22 corresponding to the manually selected virtual configuration 22'. This method allows for performing examinations at much higher speeds as compared to scanning the whole sample 14 each time. The user 11 may even follow moving objects with the help of the measuring system 10 (e.g. follow the trajectory of the transported labelled particles along the axons of nerve cells).

The precise 3D orientation is vital both in clinical applications and in scientific research when carrying out special measurements or performing interactions as described above via the operation device 26.

Another advantage of the invention is that displaying the objects in the virtual space 12' (e.g. in the case of nerve cells) enhances the interpretation of formulas similarly to post anatomic reconstructions but in real time, thereby helping, for example in the case of nerve cells, the recognition of axons, dendrites, dendrite segments or axon segments that are important from the point of view of the measurement. The virtual reality environment (VR environment) also provides a fast and natural way of selecting structures to be measured, for example it is possible to show the axon to be measured and to set quickly various measuring properties in 3D via the 3D input device 20 of the VR device 18. By refreshing only the 3D image points along the selected virtual configuration 22' it is possible to select and set the suitable measuring protocol in 3D, i.e. to define where to measure and for how long. Apart from controlling the measurement of the microscope 16 it is also possible to control via the measuring system 10 performance of photochemical stimulations, mechanical, laser manipulations within the measuring space 12 by the microscope 16 as well as the local addition (injection) of various chemical compounds and substances. The responses, measured points, curves, regions (i.e. the real configuration 22 selected by the user 11) can be displayed in the virtual space 12' in a location specific way (e.g. by showing 2D transients on 3D flags linked to the measured point, or by applying colour coded displaying the activity map of the measured real configuration 22), whereby the spatiality of the results can be better illustrated.

It should be appreciated that various modifications of the above described embodiments will be apparent to a person skilled in the art without departing from the scope of protection determined by the attached claims.

The invention claimed is:

1. Method for the 3-dimensional measurement of a sample with a measuring system having a 3-dimensional measuring space and comprising a laser scanning microscope, characterised by
providing the measuring system with a 3-dimensional virtual reality device,
creating, using the 3-dimensional virtual reality device, the 3-dimensional virtual space representing the measuring space in a real space region that is spaced from the measuring space,
providing a 3-dimensional input device for selecting operations,
selecting, via the 3-dimensional input device, an operation in the real space region wherein the virtual space is displayed,
providing real-time bidirectional connection between the measuring space and the virtual space, performing real-time in the measuring space the operation selected in the virtual space, measuring data in the measuring space when performing the selected operation using the measuring system, displaying real-time in the virtual space the data measured in the measuring space.

2. The method according to claim 1, characterised by scanning a sample or a portion of a sample placed in the measuring space of the laser scanning microscope in 3-dimension, displaying the scanned sample in the virtual space, selecting a virtual configuration comprising at least a point and/or curve and/or region, calculating the measuring space coordinates corresponding to the virtual configuration, based on the measuring space coordinates controlling the laser scanning microscope so as to scan the sample according to the virtual configuration and to perform measurement and/or interact with the sample in the course of scanning.

3. The method according to claim 2, characterised by that the virtual configuration is a quasi continuous curve consisting of points in 3-dimension or a curve interpolated on the defining points and comprising the steps of: displacing the points of the curve or the defining points of the interpolated curve in the virtual space; and modifying the measuring coordinates in the measuring space in accordance with the displacement.

4. The method according to claim 2, characterised by that the virtual space is a quasi continuous curve consisting of points in 3-dimension or a curve interpolated on the defining points and comprising the steps of: controlling functions and/or algorithms affecting the points of the curve or the defining points of the interpolated curve; displaying these; and modifying the measuring coordinates in the measuring space accordingly.

5. The method according to claim 2, characterised by scanning the sample in a plurality of planes that are orthogonal or transversal to the optical axis of the laser scanning microscope in the course of the 3-dimensional scanning of the sample, and displaying the scanned planes in the virtual space.

6. The method according to claim 5, characterised by displaying the scanned sample or portion thereof in the virtual space as spatial fog.

7. The method according to claim 5, characterised by displaying the scanned sample or portion thereof in the virtual space as spatial surface element and using one or more simulated light sources to increase the 3-dimensional effect.

8. The method according to claim 1, characterised by providing the measuring system with an operation device serving to carry out physical operation, which operation device may coincide with the measuring laser beam, selecting an operation in the virtual space for the operation device of the measuring space, performing the operation selected in the virtual space with the operation device in the measuring space.

9. The method according to claim 8, characterised by that the physical operation is a physical interaction or the measurement of physical parameters, and the operation device serving to carry out the physical operation is a robot surgical device, knife, laser ablation device, ultrasound coagulator, laser coagulator, micro injector, vacuum suction device, optical cable, prism, grid lens, electric stimulator, a measuring device to be inserted in the sample, preferably electrode, micro pipette for patch-clamp technique, extracellular recording electrode, endoscopic device, electrophoretic device.

10. The method according to claim 8, characterised by providing the 3-dimensional virtual reality device with a 3-dimensional mouse or mechanical arm the coordinate system of which is synchronised with the virtual space and being suitable for drawing and selecting 3-dimensional spatial curves and points for selecting operations.

11. The method according to claim 10, characterised by that the spatial position of the pointing device of the 3-dimensional input device provided for selecting operations coincides with the spatial position of a virtual marker belonging to the device or it is offset relative to it by a given spatial vector.

12. The method according to claim 8, characterised by changing the optical contrast or visibility of the virtual reality in a given local virtual environment of the 3-dimensional input device and optionally its 3-dimensional virtual marker (actuated by the input device), thereby preferably increasing the contrast for better viewing an interaction.

13. The method according to claim 1, characterised by that the 3-dimensional input device is a 3-dimensional marker.

14. The method according to claim 1, characterised by providing a 3-dimensional display device —preferably an autostereoscopic display —within the 3-dimensional virtual reality device in order to display data measured in the measuring space.

15. The method according to claim 14, characterised by providing for head position tracking within the 3-dimensional virtual reality device and displaying the virtual space by the 3-dimensional display device in accordance with the position of the user's head.

16. The method according to claim 1, characterised by providing the 3-dimensional virtual reality device with a 3-dimensional display device —preferably a stereoscopic display —and an active or passive stereoscopic user device —preferably glasses —in order to display data measured in the measuring space.

17. The method according to claim 1, characterised by providing the measuring system with more than one 3-dimensional virtual reality devices, creating more than one 3-dimensional virtual spaces of the measuring space by the more than one 3-dimensional virtual reality devices for more than one users.

18. The method according to claim 17, characterised by providing real time connection over a local or global network between the more than one 3-dimensional virtual reality devices and the measuring system.

19. The method according to claim 1, characterised by providing a common 3-dimensional virtual reality device for more than one measuring systems, and creating a common 3-dimensional virtual space of the more than one measuring spaces with the common 3-dimensional virtual reality device.

20. The method according to claim 1, characterised by that the measuring system comprises a two-photon laser scanning microscope or a confocal laser scanning microscope.

21. The method according to claim 20, characterised by providing z-focusing and/or xy-scanning by mechanical displacement in the 3-dimensional laser scanning microscope.

22. The method and measuring system according to claim 20, characterised by using a 3-dimensional laser scanning microscope having an acousto-optic deflector system or having a holographic scanner unit, or by using a 3-dimensional laser scanning microscope which performs 3-dimensional scanning by spatio-temporal multiplexing (i.e. by spatial impulse separation), or by using a 3-dimensional laser scanning microscope which performs 3-dimensional scanning by controlling mechanically displaceable lenses with electric field.

23. Measuring system for the 3-dimensional measurement of a sample, the measuring system having a 3-dimensional measuring space and comprising a laser scanning microscope and optionally other operation devices and being provided with a controlling system, characterised by comprising a 3-dimensional virtual reality device having real-time bidirectional connection with the controlling system for performing the method according to claim 1.

24. The method according to claim 1, characterised by operating the measuring system at one or more wavelengths simultaneously or nearly simultaneously.

25. The method according to claim 24, characterised by measuring at one or more wavelengths and simultaneously or nearly simultaneously performing physical operation at one or more different wavelengths.

26. The method and measuring system according to claim 1, characterised by displaying in the 3-dimensional virtual space the error between the physical displacement realised in the course of spatial scanning and the configuration selected for measuring, and modifying the spatial trajectory with the 3-dimensional input device so as to decrease the spatial error of the measurement.

27. Measuring system for the 3-dimensional measurement of a sample, the measuring system having a 3-dimensional measuring space and comprising a laser scanning microscope, characterised by further comprising a 3-dimensional virtual reality device for displaying a 3-dimensional virtual space representing the measuring space in a real space region that is spaced from the measuring space, the 3-dimensional virtual reality device comprising a 3-dimensional input device for selecting operations in the measuring space, and a real-time bidirectional connection is provided between the laser scanning microscope and the 3-dimensional virtual reality device.

28. The measuring system according to claim 27, characterised by comprising an operation device for performing physical operation and a real-time unidirectional or bidirectional connection is provided between the operation device and the 3-dimensional virtual reality device.

* * * * *